(12) United States Patent
Matsumoto

(10) Patent No.: US 11,043,983 B2
(45) Date of Patent: Jun. 22, 2021

(54) RADIO FREQUENCY MODULE AND COMMUNICATION DEVICE INCLUDING THE SAME

(71) Applicant: Murata Manufacturing Co., Ltd., Kyoto (JP)

(72) Inventor: Naoya Matsumoto, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/005,856

(22) Filed: Aug. 28, 2020

(65) Prior Publication Data

US 2020/0395972 A1 Dec. 17, 2020

Related U.S. Application Data

(63) Continuation of application No. PCT/JP2019/012477, filed on Mar. 25, 2019.

(30) Foreign Application Priority Data

Mar. 30, 2018 (JP) .............................. JP2018-070039

(51) Int. Cl.
*H04B 1/401* (2015.01)

(52) U.S. Cl.
CPC .................................. *H04B 1/401* (2013.01)

(58) Field of Classification Search
CPC ............. H04B 1/401; H04B 1/38; H04B 1/40
See application file for complete search history.

(56) References Cited

U.S. PATENT DOCUMENTS

| 10,116,339 B2 | 10/2018 | Anthony et al. |
| 2006/0267159 A1 | 11/2006 | Yamamoto et al. |
| 2009/0295501 A1 | 12/2009 | Hayashi et al. |
| 2012/0139641 A1* | 6/2012 | Kaczman ............... H03F 3/68 330/295 |

(Continued)

FOREIGN PATENT DOCUMENTS

| JP | 2011014659 A | 1/2011 |
| JP | 2017017691 A | 1/2017 |

(Continued)

OTHER PUBLICATIONS

International Search Report issued in Application No. PCT/JP2019/012477, dated Jun. 18, 2019.

(Continued)

*Primary Examiner* — Nguyen T Vo
(74) *Attorney, Agent, or Firm* — Pearne & Gordon LLP

(57) ABSTRACT

A first transmitting circuit transmits a first transmission signal of a first frequency band for 2G. A second transmitting circuit transmits a second transmission signal of a second frequency band for 2G. The second frequency band is higher than the first frequency band. A bypass terminal is connected to an output end of the second transmitting circuit. A third transmitting circuit transmits a third transmission signal of a third frequency band for 4G or 5G. A frequency of a harmonic wave of the third transmission signal overlaps the second frequency band. A substrate includes a ground layer. The ground layer is disposed between part of the second transmitting circuit and part of the third transmitting circuit.

15 Claims, 5 Drawing Sheets

(56) References Cited

U.S. PATENT DOCUMENTS

| | | | |
|---|---|---|---|
| 2012/0235737 A1* | 9/2012 | Reisner | H03G 3/20 |
| | | | 330/127 |
| 2013/0207731 A1* | 8/2013 | Balteanu | H03F 1/56 |
| | | | 330/296 |
| 2013/0329611 A1 | 12/2013 | Kitajima | |
| 2018/0138927 A1 | 5/2018 | Nagumo et al. | |

FOREIGN PATENT DOCUMENTS

| | | |
|---|---|---|
| WO | 2005078796 A1 | 8/2005 |
| WO | 2008004557 A1 | 1/2008 |
| WO | 2012117992 A1 | 9/2012 |
| WO | 2017013910 A1 | 1/2017 |

OTHER PUBLICATIONS

Written Opinion issued in Application No. PCT/JP2019/012477, dated Jun. 18, 2019.

\* cited by examiner

RADIO FREQUENCY MODULE AND COMMUNICATION DEVICE INCLUDING THE SAME

This is a continuation of International Application No. PCT/JP2019/012477 filed on Mar. 25, 2019 which claims priority from Japanese Patent Application No. 2018-070039 filed on Mar. 30, 2018. The contents of these applications are incorporated herein by reference in their entireties.

BACKGROUND

The present disclosure generally relates to a radio frequency module and a communication device including the radio frequency module. The present disclosure particularly relates to a radio frequency module that supports the second-generation mobile communication system (2G) and the fourth or fifth-generation mobile communication system (4G or 5G), and to a communication device including the radio frequency module.

Electronic systems using carrier aggregation have been known (see, e.g., Japanese Unexamined Patent Application Publication No. 2017-17691).

FIG. 2B in Japanese Unexamined Patent Application Publication No. 2017-17691 illustrates an electronic system that includes one antenna, one diplexer, two antenna switches, eight duplexers, two band select switches, two directional couplers, and two power amplifiers (first and second power amplifiers).

In the electronic system described above, the diplexer is connected to the antenna. Also, in this electronic system, the two power amplifiers are each connected, through a corresponding one of the two directional couplers, to a corresponding one of the two band select switches.

There have been occasions where a communication device including a low-band radio frequency module and a mid-band radio frequency module is required. The low-band radio frequency module includes a transmitting circuit (first transmitting circuit) having a power amplifier (first power amplifier) for a 2G low-band (first frequency band) and a transmitting circuit (third transmitting circuit) having a power amplifier (third power amplifier) for a 4G or 5G low-band (third frequency band). The mid-band radio frequency module is for a 4G or 5G mid-band.

There have also been occasions where, in the communication device described above, the low-band radio frequency module smaller in size than the mid-band radio frequency module is required to include a transmitting circuit (second transmitting circuit) having a power amplifier (second power amplifier) for a 2G mid-band (second frequency band).

In this case, in the communication device, a signal path on the output side of the power amplifier for the 2G mid-band needs to be connected through a bypass to the antenna switch of the mid-band radio frequency module.

However, for example, when the first frequency band for the first transmitting circuit of the low-band radio frequency module is Band 8 and a receiving circuit for Band 3 is included in the mid-band radio frequency module to perform carrier aggregation, the frequency of a second harmonic wave, which is one of harmonic waves of a transmission signal of the transmission frequency band of Band 8, overlaps the frequency band of the 2G mid-band. As a result, the harmonic wave (or radiation of the harmonic wave) jumps to the second transmitting circuit. There have been cases where the harmonic wave of the transmission signal of Band 8 passes through a bypass to the receiving circuit and this degrades the reception performance of the receiving circuit.

BRIEF SUMMARY

The present disclosure provides a radio frequency module that can prevent the harmonic wave of a transmission signal of a transmitting circuit supporting 4G or 5G from jumping to a transmitting circuit supporting 2G, and to also provide a communication device that includes the radio frequency module.

A radio frequency module according to embodiments of the present disclosure includes a first transmitting circuit, a second transmitting circuit, a bypass terminal, a third transmitting circuit, and a substrate. The first transmitting circuit includes a first power amplifier and a first matching circuit connected to a first output terminal of the first power amplifier. The first transmitting circuit transmits a first transmission signal of a first frequency band for 2G. The second transmitting circuit includes a second power amplifier and a second matching circuit connected to a second output terminal of the second power amplifier. The second transmitting circuit transmits a second transmission signal of a second frequency band for 2G. The second frequency band is higher than the first frequency band. The bypass terminal is connected to an output end of the second transmitting circuit. The third transmitting circuit includes a third power amplifier and a third matching circuit connected to a third output terminal of the third power amplifier. The third transmitting circuit transmits a third transmission signal of a third frequency band for 4G or 5G. The substrate has a first principal surface and a second principal surface opposite each other. The substrate has the first transmitting circuit, the second transmitting circuit, and the third transmitting circuit. A frequency of a harmonic wave of the third transmission signal overlaps the second frequency band. The substrate includes a ground layer. The ground layer is disposed between part of the second transmitting circuit and part of the third transmitting circuit.

A communication device according to embodiments of the present disclosure includes a first radio frequency module and a second radio frequency module. The first radio frequency module is the radio frequency module described above. The second radio frequency module includes a fourth transmitting circuit. The fourth transmitting circuit includes a fourth power amplifier. The fourth transmitting circuit transmits a fourth transmission signal of a fourth frequency band for 4G or 5G. The fourth frequency band is higher than the third frequency band. At least part of the second frequency band overlaps at least part of the fourth frequency band.

With the radio frequency module and the communication device including the radio frequency module according to embodiments of the present disclosure, the harmonic wave of the third transmission signal of the third transmitting circuit that supports 4G or 5G can be prevented from jumping to the second transmitting circuit that supports 2G.

Other features, elements, characteristics, and advantages of the present disclosure will become more apparent from the following detailed description of embodiments of the present disclosure with reference to the attached drawings.

DETAILED DESCRIPTION

Figure 1:
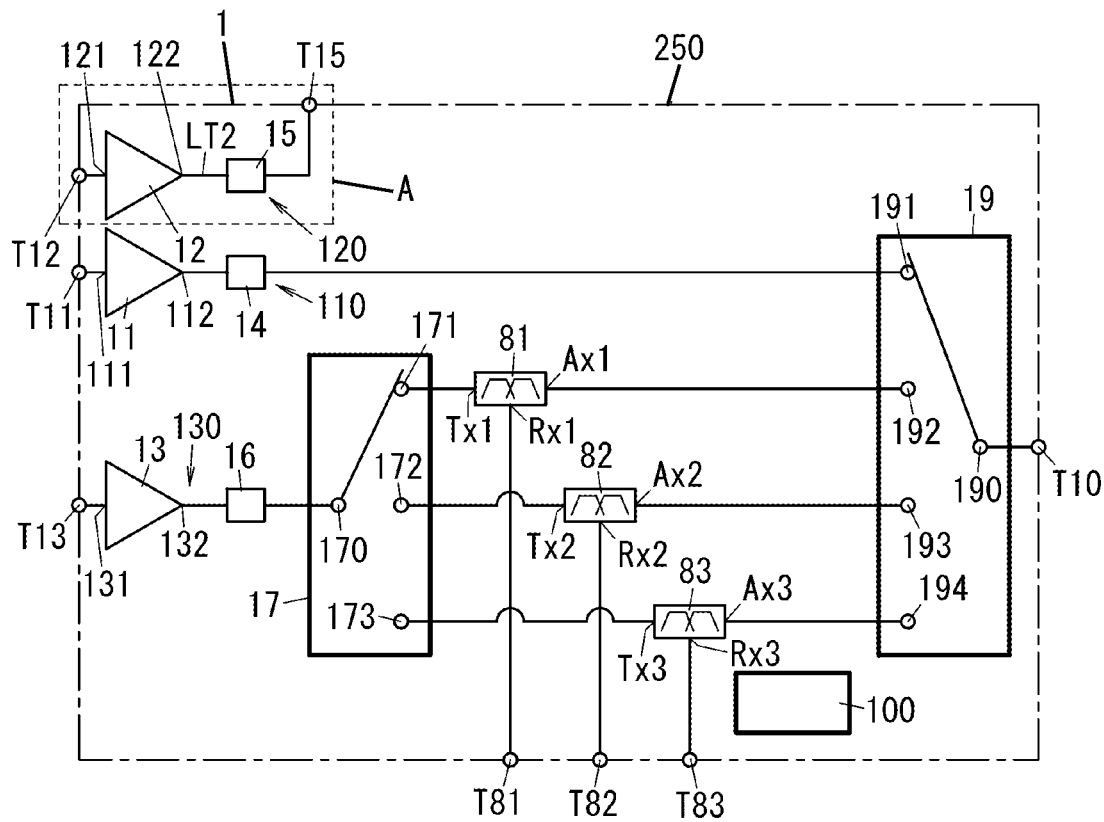
FIG. 1 is a circuit diagram of a radio frequency module according to a first embodiment of the present disclosure.

FIG. 4 to FIG. 8 that are referred to in the following description of first to fourth embodiments are schematic diagrams, in which the sizes and thicknesses of illustrated components and their ratios do not necessarily reflect the actual dimensional ratios.

First Embodiment

A radio frequency module and a communication device including the radio frequency module according to a first embodiment will now be described with reference to the drawings.

(1) Circuit Configurations of Radio Frequency Module and Communication Device Including the Same A radio frequency module 1 and a communication device 400 including the radio frequency module 1 according to the first embodiment will now be described with reference to FIG. 1 to FIG. 3. The radio frequency module 1 according to the first embodiment constitutes, for example, a radio frequency front end circuit 250 of a mobile communication device (e.g., mobile phone) which is a multiband device that supports simultaneous use of two frequency bands (e.g., carrier aggregation). The radio frequency module 1 is a module that can support carrier aggregation of a 2G mid-band and a 4G low-band, but the radio frequency module 1 is not limited to this. For example, the radio frequency module 1 may be a module that can support dual connectivity of a 2G mid-band and a 5G low-band. For example, 2G is the Global System for Mobile Communications (GSM) (registered trademark), 4G is the Third Generation Partnership Project Long-Term Evolution (3GPP LTE), and 5G is the 5G New Radio (5G NR). Examples of a GSM (registered trademark) low-band include GSM 850 and GSM 900. Examples of a GSM (registered trademark) mid-band include GSM 1800 and GSM 1900. Examples of a 3GPP LTE mid-band include Band 3. The downlink frequency band of Band 3 ranges from about 1805 MHz to about 1880 MHz, and the uplink frequency band of Band 3 ranges from about 1710 MHz to about 1785 MHz.

The communication device 400 including the radio frequency module 1 can support carrier aggregation (downlink carrier aggregation) that enables simultaneous use of a plurality of (or two, in the first embodiment) frequency bands in downlink. The communication device 400 including the radio frequency module 1 can also support carrier aggregation (uplink carrier aggregation) that enables simultaneous use of a plurality of (or two, in the first embodiment) frequency bands in uplink. Examples of a 3GPP LTE low-band include Band 8. The downlink frequency band of Band 8 ranges from about 925 MHz to about 960 MHz, and the uplink frequency band of Band 8 ranges from about 880 MHz to about 915 MHz. The communication device 400 including the radio frequency module 1 may support dual connectivity, instead of carrier aggregation. In this case, a 5G NR low-band is, for example, n8. The downlink frequency band of n8 ranges from about 925 MHz to about 960 MHz, and the uplink frequency band of n8 ranges from about 880 MHz to about 915 MHz.

(1.1) Circuit Configuration of Radio Frequency Module

As illustrated in FIG. 1, the radio frequency module 1 includes a first transmitting circuit 110, a second transmitting circuit 120, and a third transmitting circuit 130. The first transmitting circuit 110 includes a first power amplifier 11 and a first matching circuit 14. The second transmitting circuit 120 includes a second power amplifier 12 and a second matching circuit 15. The third transmitting circuit 130 includes a third power amplifier 13 and a third matching circuit 16. The radio frequency module 1 also includes a low-band antenna terminal T10, a first low-band signal input terminal T11, a mid-band signal input terminal T12, and a second low-band signal input terminal T13. The radio frequency module 1 also includes a bypass terminal T15 and a low-band antenna switch 19. The radio frequency module 1 also includes a plurality of low-band signal output terminals T81, T82, and T83.

The first power amplifier 11 has a first input terminal 111 and a first output terminal 112. The first power amplifier 11 amplifies a first transmission signal of the 2G low-band received as input through the first input terminal 111, and outputs the amplified first transmission signal from the first output terminal 112. The first transmission signal is a transmission signal of a first frequency band for 2G. The first input terminal 111 is connected to the first low-band signal input terminal T11. The first output terminal 112 is connected to the first matching circuit 14.

The second power amplifier 12 has a second input terminal 121 and a second output terminal 122. The second power amplifier 12 amplifies a second transmission signal of the 2G mid-band received as input through the second input terminal 121, and outputs the amplified second transmission signal from the second output terminal 122. The second transmission signal is a transmission signal of a second frequency band for 2G. The lower limit frequency of the second frequency band is higher than the upper limit frequency of the first frequency band. The second input terminal 121 is connected to the mid-band signal input terminal T12. The second output terminal 122 is connected to the second matching circuit 15.

The third power amplifier 13 has a third input terminal 131 and a third output terminal 132. The third power amplifier 13 amplifies a third transmission signal of the 4G or 5G low-band received as input through the third input terminal 131, and outputs the amplified third transmission signal from the third output terminal 132. The third transmission signal is a transmission signal of a third frequency band for 4G or 5G. The third input terminal 131 is connected to the second low-band signal input terminal T13. The third output terminal 132 is connected to the third matching circuit 16.

The frequency band (first frequency band) of the first transmission signal includes, for example, the frequency band of GSM 850 and the frequency band of GSM 900. The frequency band (second frequency band) of the second transmission signal includes, for example, the frequency band of GSM 1800 and the frequency band of GSM 1900. The frequency band (third frequency band) of the third transmission signal includes, for example, the frequency band of LTE Band 8.

Figure 3:
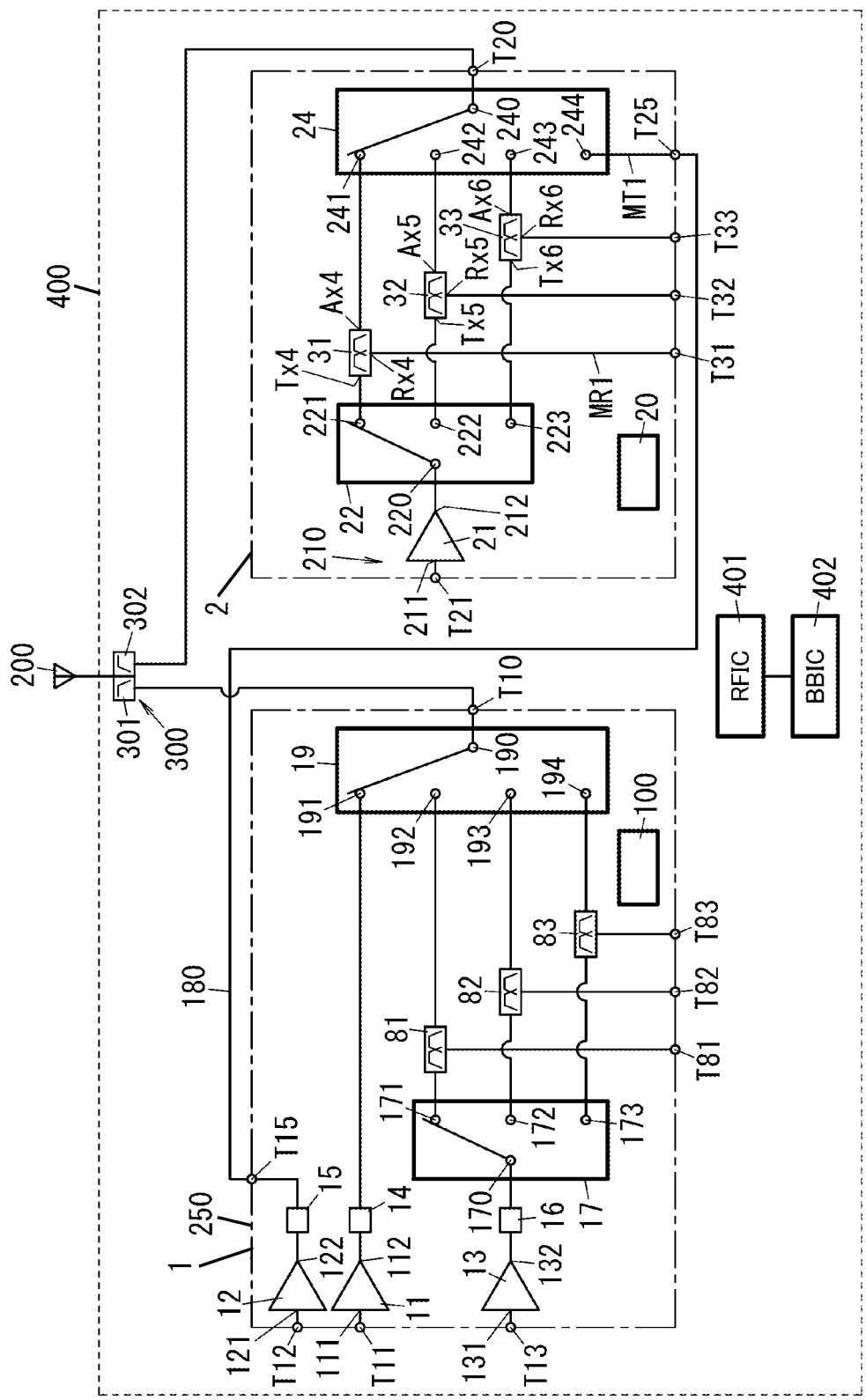
FIG. 3 is a circuit diagram of a communication device including the radio frequency module illustrated in FIG. 1.

The low-band antenna terminal T10 is electrically connected to an antenna 200 (see FIG. 3).

The bypass terminal T15 is electrically connected to the second output terminal 122 of the second power amplifier 12. More specifically, the bypass terminal T15 is electrically connected through the second matching circuit 15 to the second output terminal 122 of the second power amplifier 12.

The low-band antenna switch 19 is disposed between the low-band antenna terminal T10 and the first output terminal 112 of the first power amplifier 11 and the third output terminal 132 of the third power amplifier 13. The low-band antenna switch 19 has one common terminal 190 and a plurality of (four) selection terminals 191, 192, 193, and 194. The common terminal 190 of the low-band antenna switch 19 is connected to the low-band antenna terminal T10.

The first matching circuit 14 is disposed between the first output terminal 112 of the first power amplifier 11 and the selection terminal 191 of the low-band antenna switch 19. The first matching circuit 14 is an impedance matching circuit for matching the output impedance of a circuit disposed before the first matching circuit 14 and the input impedance of a circuit disposed after the first matching circuit 14. More specifically, on one side of the first power amplifier 11 adjacent to the low-band antenna terminal T10, the first matching circuit 14 adjusts the impedance at the fundamental frequency of the first transmission signal (i.e., the output impedance of the first power amplifier 11) to, for example, about 50Ω.

The second matching circuit 15 is disposed between the second output terminal 122 of the second power amplifier 12 and the bypass terminal T15. The second matching circuit 15 is an impedance matching circuit for matching the output impedance of a circuit disposed before the second matching circuit 15 and the input impedance of a circuit disposed after the second matching circuit 15. More specifically, on one side of the second power amplifier 12 adjacent to the bypass terminal T15, the second matching circuit 15 adjusts the impedance at the fundamental frequency of the second transmission signal (i.e., the output impedance of the second power amplifier 12) to, for example, about 50Ω.

The third matching circuit 16 is disposed between the third output terminal 132 of the third power amplifier 13 and the selection terminals 192 to 194 of the low-band antenna switch 19. The radio frequency module 1 includes a low-band band switch 17 and a plurality of (three) low-band duplexers 81, 82, and 83 between the third matching circuit 16 and the low-band antenna switch 19. This means that the third matching circuit 16 is disposed between the third output terminal 132 of the third power amplifier 13 and the low-band band switch 17. The third matching circuit 16 is an impedance matching circuit for matching the output impedance of a circuit disposed before the third matching circuit 16 and the input impedance of a circuit disposed after the third matching circuit 16. More specifically, on one side of the third power amplifier 13 adjacent to the low-band antenna terminal T10, the third matching circuit 16 adjusts the impedance at the fundamental frequency of the third transmission signal (i.e., the output impedance of the third power amplifier 13) to, for example, about 50Ω.

The low-band duplexers 81 to 83, each includes a reception filter and a transmission filter. The reception filter is a filter that allows signals of a reception frequency band to pass therethrough and attenuates signals of frequencies outside the reception frequency band. The transmission filter is a filter that allows signals of a transmission frequency band to pass therethrough and attenuates signals of frequencies outside the transmission frequency band. Although the reception filter and the transmission filter described herein are both, for example, surface acoustic wave (SAW) filters, they do not necessarily need to be SAW filters. For example, the reception filter and the transmission filter may be bulk acoustic wave (BAW) filters or dielectric filters.

The low-band duplexers 81 to 83 have different transmission frequency bands and different reception frequency bands.

The low-band duplexers 81, 82, and 83 have antenna-side terminals Ax1, Ax2, and Ax3, respectively. At the same time, the low-band duplexers 81, 82, and 83 have transmitting terminals Tx1, Tx2, and Tx3, respectively, and have receiving terminals Rx1, Rx2, and Rx3, respectively. The antenna-side terminals Ax1 to Ax3 of the low-band duplexers 81 to 83 are connected to the low-band antenna switch 19. In the low-band duplexers 81 to 83, the output terminals of the reception filters are used as the receiving terminals Rx1, Rx2, and Rx3, which are connected to the low-band signal output terminals T81, T82, and T83, respectively. Also, in the low-band duplexers 81 to 83, the input terminals of the transmission filters are used as the transmitting terminals Tx1, Tx2, and Tx3, which are connected to selection terminals 171, 172, and 173, respectively, of the low-band band switch 17. Also, in the low-band duplexers 81 to 83, terminals (ANT terminals), each connected to the output terminal of the transmission filter and the input terminal of the reception filter, are used as the antenna-side terminals Ax1, Ax2, and Ax3, which are connected to the selection terminals 192, 193, and 194, respectively, of the low-band antenna switch 19.

The low-band antenna switch 19 is disposed between the low-band antenna terminal T10 and the plurality of (three) low-band duplexers 81 to 83. Of the four selection terminals 191 to 194 of the low-band antenna switch 19, one selection terminal 191 is connected to the first matching circuit 14, and the remaining three selection terminals 192, 193, and 194 are connected one-to-one to the low-band duplexers 81, 82, and 83, respectively. The low-band antenna switch 19 is, for example, a switch integrated circuit (IC).

The low-band band switch 17 is disposed between the third output terminal 132 of the third power amplifier 13 and the transmitting terminals Tx1 to Tx3 of the low-band duplexers 81 to 83. The low-band band switch 17 allows one of the low-band duplexers 81 to 83 to be connected to the third output terminal 132 of the third power amplifier 13.

The radio frequency module 1 further includes a control circuit 100. For example, the control circuit 100 receives a control signal from a baseband signal processing circuit 402 (see FIG. 3) and controls the first power amplifier 11, the second power amplifier 12, the third power amplifier 13, the low-band antenna switch 19, and the low-band band switch 17 on the basis of the control signal. The control circuit 100 is, for example, an IC.

Figure 2:
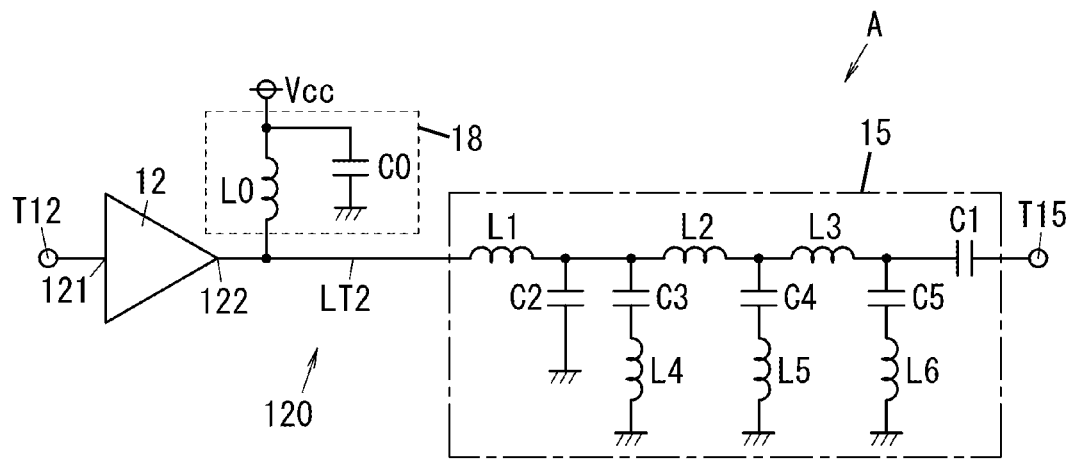
FIG. 2 relates to the radio frequency module illustrated in FIG. 1 and illustrates a detailed circuit configuration of a major part A in FIG. 1.

As illustrated in FIG. 2, the second matching circuit 15 includes a plurality of (six) inductors L1, L2, L3, L4, L5, and L6. The second matching circuit 15 also includes a plurality of (five) capacitors C1, C2, C3, C4, and C5. In the second matching circuit 15, the inductor L1 is connected at one end thereof to the second output terminal 122 of the second power amplifier 12, and is connected at the other end thereof to the bypass terminal T15 through a series circuit of the two inductors L2 and L3 and the capacitor C1. In the second matching circuit 15, the capacitor C2 is connected between a node of the two inductors L1 and L2 and the ground. Also, in the second matching circuit 15, a series circuit of the capacitor C3 and the inductor L4 is connected in parallel to the capacitor C2. Also, in the second matching circuit 15, a series circuit of the capacitor C4 and the inductor L5 is connected between the node of the two inductors L2 and L3 and the ground. Also, in the second matching circuit 15, a series circuit of the capacitor C5 and the inductor L6 is connected between the node of the inductor L3 and the capacitor C1 and the ground. The second matching circuit 15 also serves as a filter. The first matching circuit 14 includes a plurality of (two) inductors L11 and L12 and a plurality of (two) capacitors C11 and C12 (see FIG. 4). The first matching circuit 14 also serves as a filter. The third matching circuit 16 includes a plurality of (two) inductors L21 and L22 and a plurality of (two) capacitors C21 and C22 (see FIG. 4).

The radio frequency module 1 further includes a bias circuit 18 (see FIG. 2). The bias circuit 18 is a circuit for supplying a bias voltage Vcc from the control circuit 100 to the second power amplifier 12. The bias circuit 18 includes an inductor L0 and a capacitor C0. The inductor L0 is electrically connected at one end thereof to the control circuit 100, and is electrically connected at the other end thereof to the second output terminal 122 of the second power amplifier 12. For example, the control circuit 100 controls the second power amplifier 12 by varying the voltage value of the operating voltage Vcc supplied through the bias circuit 18 to the second power amplifier 12.

(1.2) Circuit Configuration of Communication Device

As illustrated in FIG. 3, the communication device 400 includes a diplexer 300, the radio frequency module 1 (which may hereinafter be also referred to as "first radio frequency module 1"), and a second radio frequency module 2. The communication device 400 further includes an RF signal processing circuit 401 and the baseband signal processing circuit 402.

The diplexer 300 includes a low-band filter 301 and a mid-band filter 302, and is connected to the antenna 200. The low-band filter 301 is a low-pass filter, and the mid-band filter 302 is a high-pass filter.

The first radio frequency module 1 is electrically connected to the low-band filter 301 of the diplexer 300. This allows the first radio frequency module 1 to be electrically connected to the antenna 200 through the low-band filter 301.

The second radio frequency module 2 is electrically connected to the mid-band filter 302 of the diplexer 300. This allows the second radio frequency module 2 to be electrically connected to the antenna 200 through the mid-band filter 302.

In the first radio frequency module 1, the low-band antenna terminal T10 is connected to the low-band filter 301.

The first low-band signal input terminal T11, the mid-band signal input terminal T12, the second low-band signal input terminal T13, and the low-band signal output terminals T81, T82, and T83 of the first radio frequency module 1 are connected to the RF signal processing circuit 401.

The second radio frequency module 2 includes a mid-band antenna terminal T20, a fourth transmitting circuit 210 including a fourth power amplifier 21, a mid-band signal input terminal T21, and a mid-band antenna switch 24. The second radio frequency module 2 also includes a mid-band transmission path MT1, a plurality of (three) mid-band duplexers 31, 32, and 33, a mid-band band switch 22, and a plurality of (three) mid-band signal output terminals T31, T32, and T33. The second radio frequency module 2 further includes a relay terminal T25 connected to the mid-band transmission path MT1.

The mid-band antenna terminal T20 is connected to the mid-band filter 302 of the diplexer 300.

The fourth power amplifier 21 has a fourth input terminal 211 and a fourth output terminal 212. The fourth power amplifier 21 amplifies a fourth transmission signal of the 4G or 5G mid-band received as input through the fourth input terminal 211, and outputs the amplified fourth transmission signal from the fourth output terminal 212. The fourth transmission signal is a transmission signal of a fourth frequency band for 4G or 5G. The fourth input terminal 211 of the fourth power amplifier 21 is connected to the mid-band signal input terminal T21.

The mid-band antenna switch 24 is disposed between the fourth output terminal 212 of the fourth power amplifier 21 and the mid-band antenna terminal T20. The mid-band antenna switch 24 is disposed between the mid-band antenna terminal T20 and the plurality of (three) mid-band duplexers 31 to 33. The mid-band antenna switch 24 has one common terminal 240 and a plurality of (four) selection terminals 241, 242, 243, and 244. The common terminal 240 of the mid-band antenna switch 24 is connected to the mid-band antenna terminal T20. Of the four selection terminals 241 to 244 of the mid-band antenna switch 24, three selection terminals 241, 242, and 243 are connected one-to-one to the mid-band duplexers 31, 32, and 33, respectively, and the remaining one selection terminal 244 is connected through the mid-band transmission path MT1 to the relay terminal T25. The mid-band antenna switch 24 is, for example, a switch IC. The mid-band antenna switch 24 has an isolation of, for example, about 20 dB to 30 dB.

The mid-band transmission path MT1 is connected to the mid-band antenna switch 24, and connected also to the bypass terminal T15 of the first radio frequency module 1. More specifically, the mid-band transmission path MT1 is connected through the relay terminal T25 to the bypass terminal T15 of the first radio frequency module 1.

The plurality of (three) mid-band duplexers 31, 32, and 33 have antenna-side terminals Ax4, Ax5, and Ax6, respectively. At the same time, the mid-band duplexers 31, 32, and 33 have transmitting terminals Tx4, Tx5, and Tx6, respectively, and have receiving terminals Rx4, Rx5, and Rx6, respectively. The antenna-side terminals Ax4 to Ax6 of the mid-band duplexers 31 to 33 are connected to the mid-band antenna switch 24. In the mid-band duplexers 31 to 33, the output terminals of the reception filters are used as the receiving terminals Rx4, Rx5, and Rx6, which are connected to the mid-band signal output terminals T31, T32, and T33, respectively. Also, in the mid-band duplexers 31 to 33, the input terminals of the transmission filters are used as the transmitting terminals Tx4, Tx5, and Tx6, which are connected to selection terminals 221, 222, and 223, respectively, of the mid-band band switch 22. Also, in the mid-band duplexers 31 to 33, terminals (ANT terminals), each connected to the output terminal of the transmission filter and the input terminal of the reception filter, are used as the antenna-side terminals Ax4, Ax5, and Ax6, which are connected to the selection terminals 241, 242, and 243, respectively, of the mid-band antenna switch 24.

The mid-band band switch 22 is disposed between the fourth output terminal 212 of the fourth power amplifier 21 and the transmitting terminals Tx4, Tx5, and Tx6 of the mid-band duplexers 31, 32, and 33. The mid-band band switch 22 allows one of the mid-band duplexers 31 to 33 to be connected to the fourth output terminal 212 of the fourth power amplifier 21.

The plurality of (three) mid-band signal output terminals T31, T32, and T33 are connected one-to-one to the receiving terminals Rx4, Rx5, and Rx6, respectively, of the plurality of (three) mid-band duplexers 31, 32, and 33.

The RF signal processing circuit 401 is connected to the first radio frequency module 1 and the second radio frequency module 2. More specifically, the RF signal processing circuit 401 is connected to the first low-band signal input terminal T11, the mid-band signal input terminal T12, the second low-band signal input terminal T13, and the low-band signal output terminals T81, T82, and T83 of the first radio frequency module 1. At the same time, the RF signal processing circuit 401 is connected to the mid-band signal input terminal T21 and the mid-band signal output terminals T31, T32, and T33 of the second radio frequency module 2.

The RF signal processing circuit 401 is, for example, a radio frequency IC (RFIC) and performs signal processing on a radio frequency signal (reception signal) output from the low-band signal output terminals T81, T82, and T83 and the mid-band signal output terminals T31, T32, and T33. The RF signal processing circuit 401 also performs signal processing, such as downconversion, on a radio frequency signal (reception signal) received through the first radio frequency module 1 or the second radio frequency module 2 as input from the antenna 200, and outputs the resulting reception signal (generated by the signal processing) to the baseband signal processing circuit 402.

The baseband signal processing circuit 402 is, for example, a baseband IC (BBIC). A reception signal generated by processing in the baseband signal processing circuit 402 is used, for example, as an image signal for image display, or as an audio signal for conversation.

The RF signal processing circuit 401 also performs signal processing, such as upconversion, on a transmission signal output from the baseband signal processing circuit 402, and outputs the resulting transmission signal (or radio frequency signal generated by the signal processing) to the first radio frequency module 1 or the second radio frequency module 2. The baseband signal processing circuit 402 performs, for example, predetermined processing on a transmission signal from outside the communication device 400.

The communication device 400 further includes a bypass 180 and a control circuit 20.

The bypass 180 electrically connects the bypass terminal T15 to the mid-band transmission path MT1. More specifically, the bypass 180 electrically connects the bypass terminal T15 to the relay terminal T25 connected to the mid-band transmission path MT1. The bypass 180 includes, for example, a wiring conductor on a printed wiring board having the first radio frequency module 1 and the second radio frequency module 2 mounted thereon. In this case, the communication device 400 includes the printed wiring board as its component.

The control circuit 20 switches the mid-band antenna switch 24 so as to enable one of the mid-band duplexers 31 to 33 and the mid-band transmission path MT1 to be connected to the mid-band filter 302 of the diplexer 300.

In the communication device 400, the first frequency band of the first transmission signal includes the frequency band of GSM 850 and the frequency band of GSM 900. The second frequency band of the second transmission signal includes the frequency band of GSM 1800 and the frequency band of GSM 1900. The third frequency band of the third transmission signal includes the frequency band of LTE Band 8. The fourth frequency band of the fourth transmission signal includes the frequency band of LTE Band 3. Of the mid-band duplexers 31, 32, and 33, the mid-band duplexer 31 is a duplexer that supports 4G or 5G. For example, the mid-band duplexer 31 is a duplexer for Band 3 of LTE or n8 of 5G NR. In the second radio frequency module 2, a signal path between the mid-band antenna switch 24 and the mid-band signal output terminal T31 constitutes a mid-band reception path MR1. This enables the communication device 400 to support downlink carrier aggregation of Band 8 and Band 3 or dual connectivity of n8 and Band 3. The mid-band duplexer 32 is a duplexer that supports 4G or 5G. For example, the mid-band duplexer 32 is a duplexer for LTE Band 12. The mid-band duplexer 33 is a duplexer that supports 4G or 5G. For example, the mid-band duplexer 33 is a duplexer for LTE Band 20.

(2) Structure of Radio Frequency Module

Figure 4:
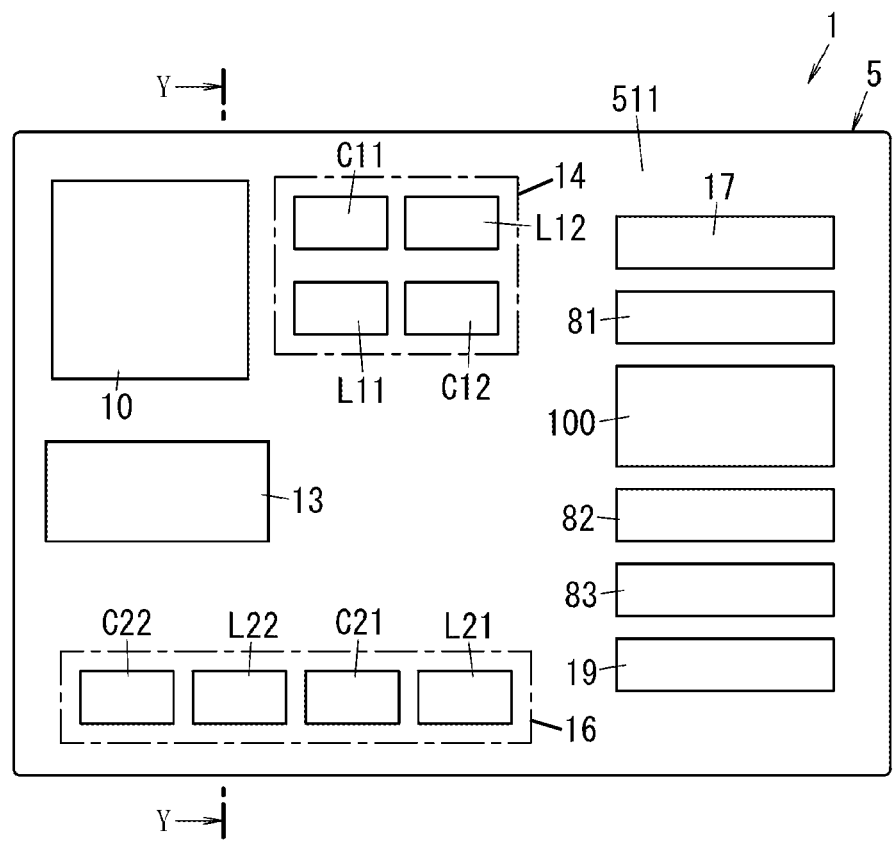
FIG. 4 is a plan view of the radio frequency module illustrated in FIG. 1.
Figure 5:
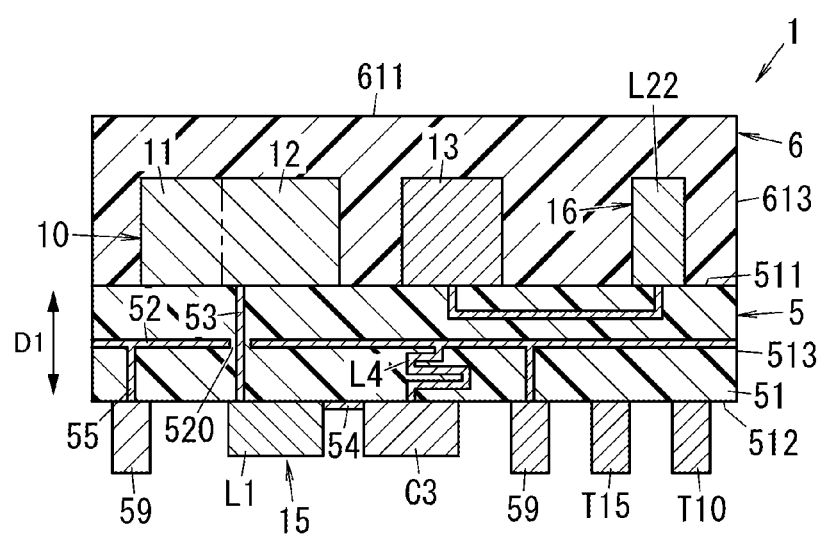
FIG. 5 relates to the radio frequency module illustrated in FIG. 1 and illustrates a cross-section taken along line Y-Y in FIG. 4.

A structure of the radio frequency module 1 will now be described with reference to FIG. 4 and FIG. 5.

As described above, the radio frequency module 1 includes the first transmitting circuit 110 including the first power amplifier 11 and the first matching circuit 14, the second transmitting circuit 120 including the second power amplifier 12 and the second matching circuit 15, and the third transmitting circuit 130 including the third power amplifier 13 and the third matching circuit 16. The radio frequency module 1 also includes the low-band antenna terminal T10, the bypass terminal T15, the low-band band switch 17, and the low-band antenna switch 19. Also, the radio frequency module 1 includes a substrate 5. The substrate 5 has at least the first power amplifier 11, the second power amplifier 12, and the third power amplifier 13 mounted thereon. The substrate 5 also has the low-band antenna switch 19 mounted thereon.

In the radio frequency module 1, the first power amplifier 11 and the second power amplifier 12 are integrated into a single semiconductor chip 10. The third power amplifier 13 forms a semiconductor chip different from the semiconductor chip 10.

In the radio frequency module 1, the low-band band switch 17 is a switch IC, and the low-band antenna switch 19 is also a switch IC. The low-band band switch 17 and the low-band antenna switch 19 are mounted on the substrate 5. An IC constituting the control circuit 100 is also mounted on the substrate 5.

The inductors L11 and L12 of the first matching circuit 14 are, for example, chip inductors. The capacitors C11 and C12 of the first matching circuit 14 are chip capacitors. The inductors L11 and L12 and the capacitors C11 and C12 of the first matching circuit 14 are mounted on the substrate 5.

Of the inductors L1 to L6 of the second matching circuit 15, the inductors L1, L2, L3, L5, and L6 are chip inductors mounted on the substrate 5, whereas the inductor L4 is an internal inductor formed in the substrate 5. The capacitors C1 to C5 of the second matching circuit 15 are chip capacitors mounted on the substrate 5.

The inductors L21 and L22 of the third matching circuit 16 are, for example, chip inductors. The capacitors C21 and C22 of the third matching circuit 16 are chip capacitors. The inductors L21 and L22 and the capacitors C21 and C22 of the third matching circuit 16 are mounted on the substrate 5.

The substrate 5 is a multilayer substrate including a plurality of dielectric layers and a plurality of conductor pattern layers. More specifically, the substrate 5 is a printed wiring board. The dielectric layers and the conductor pattern layers are stacked in the direction of thickness (hereinafter referred to as "thickness direction D1") of the substrate 5. The conductor pattern layers are each formed in a predetermined pattern. The conductor pattern layers, each includes one or more conductor portions in a plane orthogonal to the thickness direction D1 of the substrate 5. For example, the conductor pattern layers are made of copper.

The substrate 5 includes a dielectric substrate 51 and a ground layer 52. The substrate 5 has a first principal surface 511 and a second principal surface 512 opposite each other. The first principal surface 511 and the second principal surface 512 are surfaces that intersect the thickness direction D1 of the substrate 5. The ground layer 52 is separated from the first principal surface 511. More specifically, in the dielectric substrate 51, the ground layer 52 is separated from the first principal surface 511 in the thickness direction D1 of the substrate 5. In a plane orthogonal to the thickness direction D1, the ground layer 52 has substantially the same area as the dielectric substrate 51. The ground layer 52 has a hole 520 for avoiding short circuit with a through electrode 53 (described below). Accordingly, in the plane orthogonal to the thickness direction D1, the area of the ground layer 52 is smaller than the area of the dielectric substrate 51 by the opening area of the hole 520. With the ground layer 52, the substrate 5 can enhance isolation, for example, between the conductor pattern layers adjacent to the first principal surface 511 and the conductor pattern layers adjacent to the second principal surface 512. In other words, it is possible to enhance isolation between the first principal surface 511 and the second principal surface 512 of the substrate 5.

The dielectric substrate 51 includes a plurality of dielectric layers. The dielectric substrate 51 is electrically insulating and substantially in the shape of a plate. In plan view from the thickness direction D1 of the substrate 5, the dielectric substrate 51 and the substrate 5 are, for example, substantially rectangular in shape. However, the shape is not limited to this and the dielectric substrate 51 and the substrate 5 may be substantially square in shape.

The ground layer 52 is constituted by one of the plurality of conductor pattern layers. For example, the ground layer 52 is a ground electrode to which a ground potential is applied. The ground layer 52 is disposed closer to the second principal surface 512 of the substrate 5 than to the first principal surface 511 of the substrate 5.

In the radio frequency module 1, the low-band antenna terminal T10, the first low-band signal input terminal T11, the mid-band signal input terminal T12, the second low-band signal input terminal T13, the bypass terminal T15, and the low-band signal output terminals T81, T82, and T83 are disposed to protrude from the second principal surface 512 of the substrate 5 to serve as external connection terminals. Also, in the radio frequency module 1, a ground terminal 59 connected to the ground layer 52 through a via conductor 55 is disposed to protrude from the second principal surface 512 of the substrate 5 to serve as an external connection terminal.

In the radio frequency module 1, the semiconductor chip 10 (i.e., the first power amplifier 11 and the second power amplifier 12), the third power amplifier 13, and the third matching circuit 16 are disposed on the first principal surface 511 of the substrate 5. The semiconductor chip 10 and the third power amplifier 13 are flip-chip mounted on the substrate 5. As for the second matching circuit 15 connected to the second output terminal 122 of the second power amplifier 12, at least the inductor L1 of the inductors L1 to L6 is disposed closer to the second principal surface 512 of the substrate 5 than to the first principal surface 511 of the substrate 5. More specifically, at least the inductor L1 of the inductors L1 to L6 is disposed on one side of the ground layer 52 adjacent to the second principal surface 512, in the thickness direction D1 of the substrate 5. In the radio frequency module 1 according to the first embodiment, the inductors L1 to L6 are disposed closer to the second principal surface 512 of the substrate 5 than to the first principal surface 511 of the substrate 5.

The inductor L1 is disposed on the second principal surface 512 of the substrate 5 opposite the first principal surface 511. That is, the inductor L1 is surface-mounted on the substrate 5. In the radio frequency module 1 of the first embodiment, the second power amplifier 12 overlaps the inductor L1 in the thickness direction D1 of the substrate 5. The substrate 5 of the radio frequency module 1 includes the through electrode 53. The through electrode 53 penetrates the dielectric substrate 51 in the thickness direction D1 to connect the inductor L1 to the second output terminal 122 of the second power amplifier 12. The second principal surface 512 of the substrate 5 includes the surface of a conductor pattern layer including a wiring conductor 54 that connects the inductor L1 to the capacitor C3.

The inductor L4 of the second matching circuit 15 is disposed inside the substrate 5.

The radio frequency module 1 further includes a cover layer 6 (see FIG. 5) on the first principal surface 511 of the substrate 5. The cover layer 6 covers, for example, a plurality of electronic components mounted on the substrate 5. Examples of the electronic components include the semiconductor chip 10 (i.e., the semiconductor chip including the first power amplifier 11 and the second power amplifier 12), the third power amplifier 13, the two inductors L11 and L12 and the two capacitors C11 and C12 of the first matching circuit 14, the two inductors L21 and L22 and the two capacitors C21 and C22 of the third matching circuit 16, the low-band duplexers 81 to 83, the low-band antenna switch 19, the low-band band switch 17, and the control circuit 100. Note that the cover layer 6 is not shown in FIG. 4.

The cover layer 6 is electrically insulating and configured to seal the electronic components. For example, the cover layer 6 is made of an electrically insulating resin (e.g., epoxy resin). The cover layer 6 has a principal surface 611 that intersects the thickness direction D1 of the substrate 5 and a side face 613 that extends along the thickness direction D1.

(3) Advantageous Effects

The radio frequency module 1 according to the first embodiment includes the first power amplifier 11, the second power amplifier 12, the third power amplifier 13, the low-band antenna terminal T10, the bypass terminal T15, the second matching circuit 15, the third matching circuit 16, and the substrate 5. The first power amplifier 11 has the first input terminal 111 and the first output terminal 112. The first power amplifier 11 amplifies the first transmission signal of the 2G low-band received as input through the first input terminal 111, and outputs the amplified first transmission signal from the first output terminal 112. The second power amplifier 12 has the second input terminal 121 and the second output terminal 122. The second power amplifier 12 amplifies the second transmission signal of the 2G mid-band received as input through the second input terminal 121, and outputs the amplified second transmission signal from the second output terminal 122. The third power amplifier 13 has the third input terminal 131 and the third output terminal 132. The third power amplifier 13 amplifies the third transmission signal of the 4G or 5G low-band received as input through the third input terminal 131, and outputs the amplified third transmission signal from the third output terminal 132. The bypass terminal T15 is electrically connected to the second output terminal 122. The second matching circuit 15 is electrically connected to the second output terminal 122 and includes one or more inductors L1 to L6. The third matching circuit 16 is electrically connected to the third output terminal 132 and includes one or more inductors L21 and L22. The substrate 5 has thereon the first power amplifier 11, the second power amplifier 12, the third power amplifier 13, the second matching circuit 15, and the third matching circuit 16 and includes therein the ground layer 52. The ground layer 52 is disposed between at least the inductor L1 of the inductors L1 to L6 of the second matching circuit 15 and at least one of the inductors L21 and L22 of the third matching circuit 16.

The radio frequency module 1 according to the first embodiment can prevent radiation on the output side of the third power amplifier 13, which is a power amplifier for the 4G or 5G low-band, from jumping to the output side of the second power amplifier 12, which is a power amplifier for the 2G mid-band. For example, when transmitting the third transmission signal of Band 8 using the third power amplifier 13 for the 4G or 5G low-band, the radio frequency module 1 of the first embodiment can prevent radiation from the at least one of the inductors L21 and L22 of the third matching circuit 16 (i.e., harmonic wave of the third transmission signal) from jumping to at least the inductor L1 of the second matching circuit 15 adjacent to the second output terminal 122 of the second power amplifier 12 for the 2G mid-band. That is, the radio frequency module 1 can prevent magnetic coupling between the at least one of the inductors L21 and L22 of the third matching circuit 16 and at least the inductor L1 of the second matching circuit 15 from causing jumping of radiation.

The radio frequency module 1 according to the first embodiment further includes the low-band antenna switch 19 and the reception filter. The low-band antenna switch 19 is disposed between the low-band antenna terminal T10 and the first output terminal 112 of the first power amplifier 11 and the third output terminal 132 of the third power amplifier 13. The reception filter is disposed between the low-band antenna switch 19 and the third matching circuit 16 and is for the 4G or 5G low-band. That is, the reception filter allows passage of reception signals of the third frequency band for 4G or 5G. Thus, for example, in two-downlink carrier aggregation of Band 8 and Band 3, the communication device 400 of the first embodiment can prevent the harmonic wave of Band 8 from flowing through the bypass terminal T15 into the mid-band duplexer 31 of the second radio frequency module 2, and thus can improve communication performance. The combination of two bands for two-downlink carrier aggregation does not necessarily need to be the combination of Band 8 and Band 3.

Note that the communication device 400 does not simultaneously perform transmission in the 2G mid-band and reception in the 4G or 5G mid-band.

Second Embodiment

Figure 6:
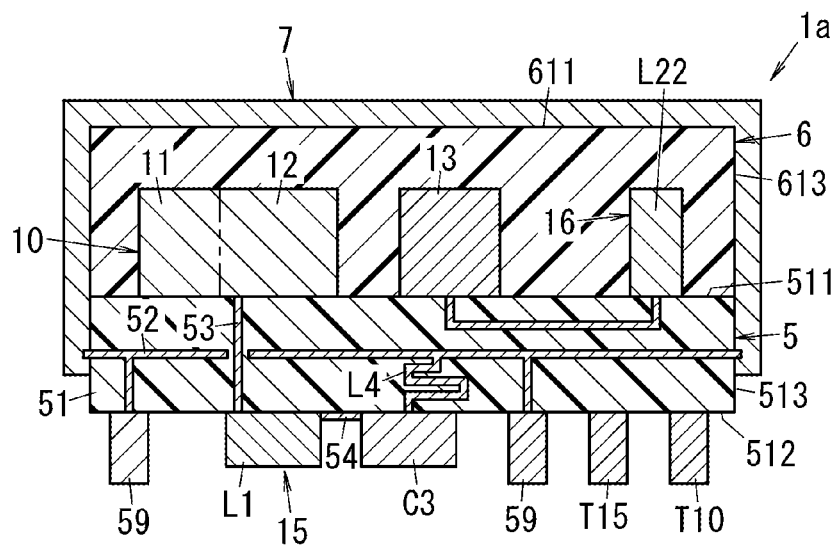
FIG. 6 is a cross-sectional view of a radio frequency module according to a second embodiment of the present disclosure.

A radio frequency module 1a according to a second embodiment will now be described with reference to FIG. 6. For the radio frequency module 1a according to the second embodiment, components that are similar to those of the radio frequency module 1 according to the first embodiment will be denoted by the same reference numerals and their description will be omitted.

The radio frequency module 1a of the second embodiment differs from the radio frequency module 1 of the first embodiment in that the radio frequency module 1a includes a shielding layer 7 that covers the cover layer 6.

The shielding layer 7 is made of metal. The shielding layer 7 covers the principal surface 611 and the side face 613 of the cover layer 6 and part of a side face 513 of the substrate 5. The shielding layer 7 is in contact with the ground layer 52. This can make the potential of the shielding layer 7 equal to the potential of the ground layer 52.

Like the radio frequency module 1 of the first embodiment, the radio frequency module 1a of the second embodiment can prevent radiation on the output side of the third power amplifier 13, which is a power amplifier for the 4G or 5G low-band, from jumping to the output side of the second power amplifier 12, which is a power amplifier for the 2G mid-band. With the shielding layer 7, the radio frequency module 1a of the second embodiment can more effectively reduce the effect of radiation than the radio frequency module 1 of the first embodiment does. The first radio frequency module 1 of the communication device 400 according to the first embodiment may be replaced by the radio frequency module 1a.

Third Embodiment

Figure 7:
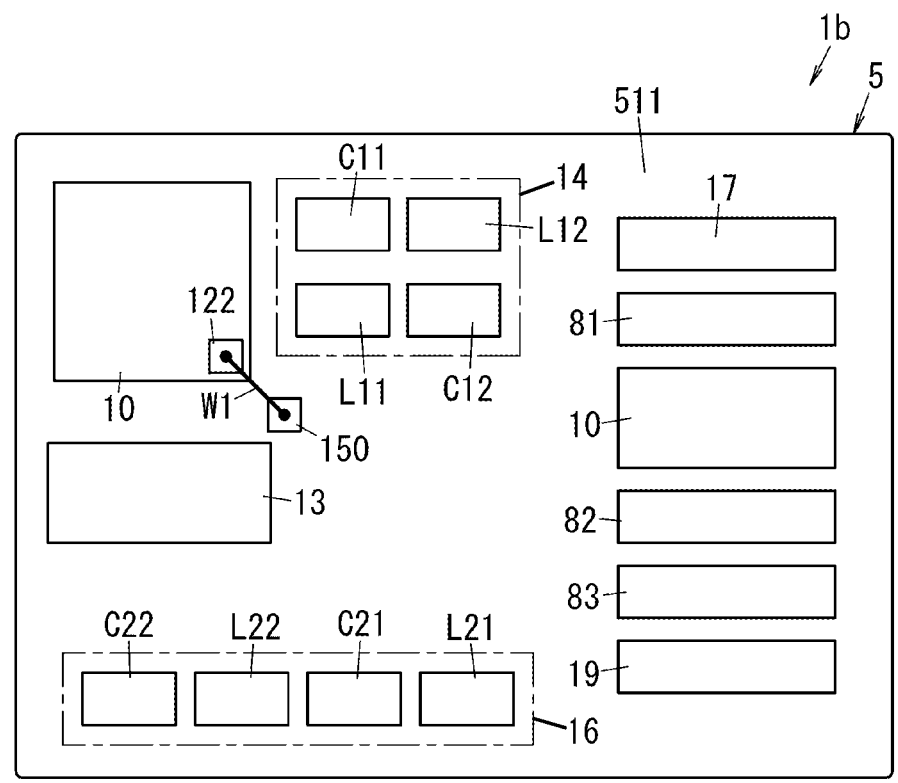
FIG. 7 is a plan view of a radio frequency module according to a third embodiment of the present disclosure.

A radio frequency module 1b according to a third embodiment will now be described with reference to FIG. 7. For the radio frequency module 1b according to the third embodiment, components that are similar to those of the radio frequency module 1 according to the first embodiment will be denoted by the same reference numerals and their description will be omitted.

Like the radio frequency module 1 of the first embodiment, the radio frequency module 1b of the third embodiment includes the semiconductor chip 10. The semiconductor chip 10 includes the first power amplifier 11 (see FIG. 1 and FIG. 5) and the second power amplifier 12 (see FIG. 1 and FIG. 5). The radio frequency module 1b of the third embodiment differs from the radio frequency module 1 of the first embodiment in that the second output terminal 122 of the second power amplifier 12 of the semiconductor chip 10 is connected through a bonding wire W1 to an electrode 150 on the substrate 5. Like the radio frequency module 1 of the first embodiment, the radio frequency module 1b of the third embodiment can prevent radiation on the output side of the third power amplifier 13, which is a power amplifier for the 4G or 5G low-band, from jumping to the output side of the second power amplifier 12, which is a power amplifier for the 2G mid-band. The first radio frequency module 1 of the communication device 400 according to the first embodiment may be replaced by the radio frequency module 1b.

Fourth Embodiment

A radio frequency module 1c according to a fourth embodiment will now be described with reference to FIG. 8. For the radio frequency module 1c according to the fourth embodiment, components that are similar to those of the radio frequency module 1 according to the first embodiment will be denoted by the same reference numerals and their description will be omitted.

The radio frequency module 1c of the fourth embodiment differs from the radio frequency module 1 of the first embodiment in that the third output terminal 132 of the third power amplifier 13 is connected through a bonding wire W2 to an electrode 160 on the substrate 5.

Figure 8:
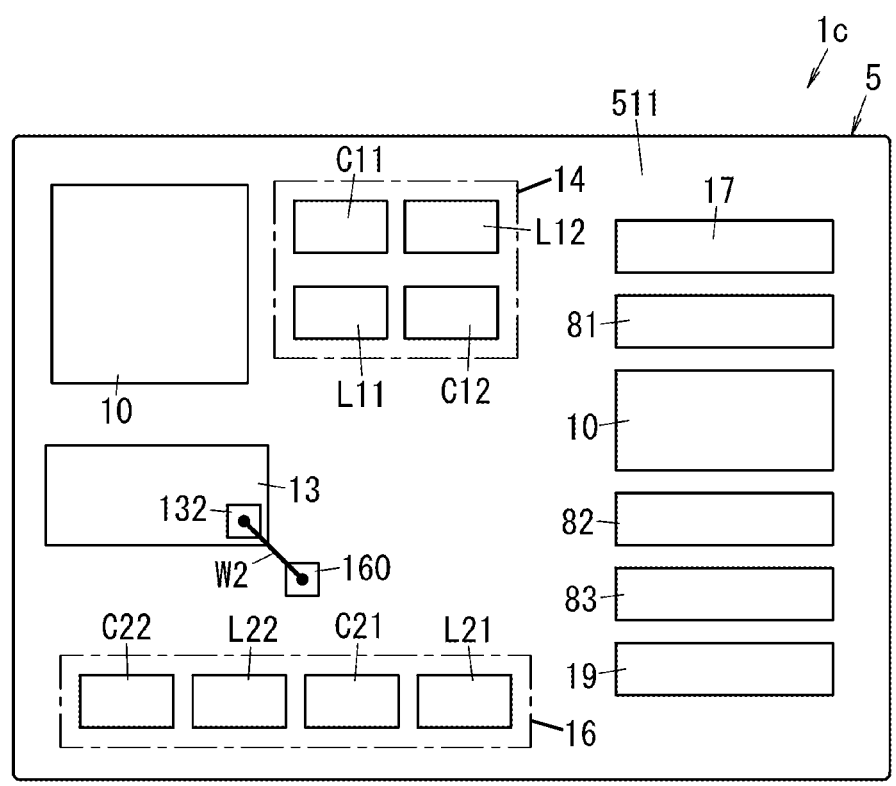
FIG. 8 is a plan view of a radio frequency module according to a fourth embodiment of the present disclosure.

Like the radio frequency module 1 of the first embodiment, the radio frequency module 1c of the fourth embodiment includes, as illustrated in FIG. 1, the first power amplifier 11, the second power amplifier 12, the third power amplifier 13, the low-band antenna terminal T10, the bypass terminal T15, the second matching circuit 15, the third matching circuit 16, and the substrate 5 (see FIG. 8). The first power amplifier 11 has the first input terminal 111 and the first output terminal 112. The first power amplifier 11 amplifies the first transmission signal of the 2G low-band received as input through the first input terminal 111, and outputs the amplified first transmission signal from the first output terminal 112. The second power amplifier 12 has the second input terminal 121 and the second output terminal 122. The second power amplifier 12 amplifies the second transmission signal of the 2G mid-band received as input through the second input terminal 121, and outputs the amplified second transmission signal from the second output terminal 122. The third power amplifier 13 has the third input terminal 131 and the third output terminal 132. The third power amplifier 13 amplifies the third transmission signal of the 4G or 5G low-band received as input through the third input terminal 131, and outputs the amplified third transmission signal from the third output terminal 132. The bypass terminal T15 is electrically connected to the second output terminal 122. The second matching circuit 15 is electrically connected to the second output terminal 122 and includes one or more inductors L1 to L6 (see FIG. 2 and FIG. 5). The third matching circuit 16 is electrically connected to the third output terminal 132 through the bonding wire W2, as illustrated in FIG. 8, and includes one or more inductors L21 and L22. The substrate 5 has thereon the first power amplifier 11, the second power amplifier 12, the third power amplifier 13, the second matching circuit 15, and the third matching circuit 16 and includes therein the ground layer 52. The ground layer 52 is disposed between at least the inductor L1 of the inductors L1 to L6 of the second matching circuit 15 and the bonding wire W2.

Like the radio frequency module 1 of the first embodiment, the radio frequency module 1c of the fourth embodiment can prevent radiation on the output side of the third power amplifier 13, which is a power amplifier for the 4G or 5G low-band, from jumping to the output side of the second power amplifier 12, which is a power amplifier for the 2G mid-band. The first radio frequency module 1 of the communication device 400 according to the first embodiment may be replaced by the radio frequency module 1c.

The first to fourth embodiments are merely examples of various embodiments of the present disclosure. As long as the object of the present disclosure is achievable, the first to fourth embodiments may be variously modified, for example, as the design changes.

In the radio frequency module 1 of the first embodiment, all the inductors L1 to L6 of the second matching circuit 15, except the inductor L4, are mounted on the second principal surface 512 of the substrate 5. The inductors L1 to L6 are all disposed on one side of the ground layer 52 adjacent to the second principal surface 512 in the thickness direction D1 of the substrate 5. However, the configuration is not limited to this, and it is suitable, in the radio frequency module 1, that at least one of the inductors L1 to L6 of the second matching circuit 15 be disposed on one side of the ground layer 52 adjacent to the second principal surface 512 in the thickness direction D1 of the substrate 5. In the radio frequency module 1, of the inductors L1 to L6, the inductor L1 electrically closest to the second output terminal 122 of the second power amplifier 12 can be disposed on the side of the ground layer 52 adjacent to the second principal surface 512 in the thickness direction D1 of the substrate 5.

All the inductors L1 to L6 of the second matching circuit 15 may be disposed on the second principal surface 512 of the substrate 5 opposite the first principal surface 511. That is, all the inductors L1 to L6 may be surface-mounted.

The physical configuration of the ground layer 52 is not limited to that in the first to fourth embodiments described above. It is suitable that the ground layer 52 be disposed between part of the second transmitting circuit 120 and part of the third transmitting circuit 130. That is, in plan view from the thickness direction D1 of the substrate 5, the ground layer 52 disposed between part of the second transmitting circuit 120 and part of the third transmitting circuit 130 does not necessarily need to overlap all the components of the second transmitting circuit 120 (e.g., the second power amplifier 12 and the second matching circuit 15) and all the components of the third transmitting circuit 130 (e.g., the third power amplifier 13 and the third matching circuit 16). For example, the ground layer 52 may be disposed between the second power amplifier 12 or second matching circuit 15 and the third power amplifier 13 or third matching circuit 16. Although each of the second matching circuit 15 and the third matching circuit 16 serves as a filter (transmission filter), the configuration is not limited to this. For example, the second transmitting circuit 120 may include a transmission filter along with the second matching circuit 15, and the third transmitting circuit 130 may include a transmission filter along with the third matching circuit 16. In this case, when the ground layer 52 is disposed between at least the transmission filter of the second transmitting circuit 120 and the transmission filter of the third transmitting circuit 130, the harmonic wave of the third transmission signal from the third transmitting circuit 130 can be prevented from jumping to the second transmitting circuit 120. Also, when the third transmitting circuit 130 includes the low-band duplexers 81 to 83, if the ground layer 52 is disposed between the low-band duplexers 81 to 83 and the transmission filter of the second transmitting circuit 120, the harmonic wave of the third transmission signal from the third transmitting circuit 130 can be prevented from jumping to the second transmitting circuit 120.

In the radio frequency module 1c according to the fourth embodiment, the semiconductor chip 10 including the first power amplifier 11 and the second power amplifier 12 and the third matching circuit 16 are disposed on the first principal surface 511 of the substrate 5. However, the configuration is not limited to this, and the semiconductor chip 10 and the third matching circuit 16 may be disposed on the second principal surface 512 of the substrate 5. In this case, the third output terminal 132 of the third power amplifier 13 may be connected through a bonding wire to an electrode on the second principal surface 512 of the substrate 5.

The low-band duplexers 81 to 83 of the radio frequency modules 1, 1a, 1b, and 1c according to the first, second, third, and fourth embodiments may each be replaced by a transmission filter and a reception filter. The low-band duplexers 81 to 83 do not necessarily need to be mounted on the substrate 5. The low-band duplexers 81 to 83 of the radio frequency modules 1, 1a, 1b, and 1c according to the first, second, third, and fourth embodiments may each be replaced by a multiplexer.

Any of the radio frequency modules 1, 1a, 1b, and 1c according to the first, second, third, and fourth embodiments may include some or all the components of the second radio frequency module 2. Any of the radio frequency modules 1, 1a, 1b, and 1c according to the first, second, third, and fourth embodiments may include some or all the components of the second radio frequency module 2 and the diplexer 300.

The communication device 400 may have any configuration that supports at least two downlinks. For example, the communication device 400 may be configured to support three downlinks. In this case, the communication device 400 may include a triplexer, instead of the diplexer 300.

SUMMARY

The embodiments described above disclose the following aspects of the present disclosure.

A radio frequency module (1, 1*a*, 1*b*, or 1*c*) according to a first aspect includes a first transmitting circuit (110), a second transmitting circuit (120), a bypass terminal (T15), a third transmitting circuit (130), and a substrate (5). The first transmitting circuit (110) includes a first power amplifier (11) and a first matching circuit (14) connected to a first output terminal (112) of the first power amplifier (11). The first transmitting circuit (110) transmits a first transmission signal of a first frequency band for 2G. The second transmitting circuit (120) includes a second power amplifier (12) and a second matching circuit (15) connected to a second output terminal (122) of the second power amplifier (12). The second transmitting circuit (120) transmits a second transmission signal of a second frequency band for 2G. The second frequency band is higher than the first frequency band. The bypass terminal (T15) is connected to an output end of the second transmitting circuit (120). The third transmitting circuit (130) includes a third power amplifier (13) and a third matching circuit (16) connected to a third output terminal (132) of the third power amplifier (13). The third transmitting circuit (130) transmits a third transmission signal of a third frequency band for 4G or 5G. The substrate (5) has a first principal surface (511) and a second principal surface (512) opposite each other. The substrate (5) has the first transmitting circuit (110), the second transmitting circuit (120), and the third transmitting circuit (130). A frequency of a harmonic wave of the third transmission signal overlaps the second frequency band. The substrate (5) includes a ground layer (52). The ground layer (52) is disposed between part of the second transmitting circuit (120) and part of the third transmitting circuit (130).

The radio frequency modules (1, 1*a*, 1*b*, and 1*c*) according to the first aspect can prevent the harmonic wave of the third transmission signal of the third transmitting circuit (130) supporting 4G or 5G from jumping to the second transmitting circuit (120) supporting 2G.

According to a second aspect, in the radio frequency module (1, 1*a*, 1*b*, or 1*c*) according to the first aspect, the second matching circuit (15) of the second transmitting circuit (120) is mounted on the second principal surface (512) of the substrate (5) and the third matching circuit (16) of the third transmitting circuit (130) is mounted on the first principal surface (511) of the substrate (5). The ground layer (52) is disposed between the second matching circuit (15) and the third matching circuit (16).

According to a third aspect, in the radio frequency module (1, 1*a*, 1*b*, or 1*c*) according to the first or second aspect, the second matching circuit (15) includes one or more inductors (L1 to L6) and the third matching circuit (16) includes one or more inductors (L21 and L22). The ground layer (52) is disposed between at least one (L1) of the one or more inductors (L1 to L6) of the second matching circuit (15) and at least one (L21 or L22) of the one or more inductors (L21 and L22) of the third matching circuit (16).

The radio frequency modules (1, 1*a*, 1*b*, and 1*c*) according to the third aspect can prevent the harmonic wave of the third transmission signal from jumping from the third matching circuit (16) of the third transmitting circuit (130) supporting 4G or 5G to the second matching circuit (15) of the second transmitting circuit (120) supporting 2G.

According to a fourth aspect, the radio frequency module (1, 1*a*, 1*b*, or 1*c*) according to any one of the first to third aspects further includes a low-band antenna terminal (T10), a low-band antenna switch (19), and a reception filter. The low-band antenna switch (19) is disposed between the low-band antenna terminal (T10) and the first output terminal (112) of the first power amplifier (11) and the third output terminal (132) of the third power amplifier (13). The reception filter is disposed between the low-band antenna switch (19) and the third matching circuit (16), and configured to allow a reception signal of the third frequency band for 4G or 5G to pass therethrough.

According to a fifth aspect, the radio frequency module (1, 1*a*, 1*b*, or 1*c*) according to the fourth aspect further includes a plurality of low-band duplexers (81, 82, and 83), a low-band band switch (17), and a plurality of low-band signal output terminals (T81, T82, and T83). The low-band duplexers (81, 82, and 83), each has a corresponding one of antenna-side terminals (Ax1, Ax2, and Ax3), a corresponding one of transmitting terminals (Tx1, Tx2, and Tx3), and a corresponding one of receiving terminals (Rx1, Rx2, and Rx3). The antenna-side terminals (Ax1, Ax2, and Ax3) are connected to the low-band antenna switch (19). The low-band band switch (17) is disposed between the third output terminal (132) and the transmitting terminals (Tx1, Tx2, and Tx3) of the low-band duplexers (81, 82, and 83). The low-band band switch (17) connects one of the low-band duplexers (81, 82, and 83) to the third output terminal (132). The low-band signal output terminals (T81, T82, and T83) are connected one-to-one to the respective receiving terminals (Rx1, Rx2, and Rx3) of the low-band duplexers (81, 82, and 83).

According to a sixth aspect, in the radio frequency module (1, 1*a*, 1*b*, or 1*c*) according to any one of the first to fifth aspects, the first frequency band includes a frequency band of GSM 850 and a frequency band of GSM 900. The second frequency band includes a frequency band of GSM 1800 and a frequency band of GSM 1900. The third frequency band includes a frequency band of Band 8 of LTE or a frequency band of n8 of 5G NR.

According to a seventh aspect, in the radio frequency module (1, 1*a*, 1*b*, or 1*c*) according to the third aspect, the first power amplifier (11) and the third power amplifier (13) are disposed closer to the first principal surface (511) of the substrate (5) than to the second principal surface (512) of the substrate (5). At least one inductor (L1) of the second matching circuit (15) is disposed on the second principal surface (512) of the substrate (5) opposite the first principal surface (511).

The radio frequency modules (1, 1*a*, 1*b*, and 1*c*) according to the seventh aspect can prevent radiation on the output side of the third power amplifier (13) from jumping to the output side (signal path LT2) of the second power amplifier (12).

According to an eighth aspect, in the radio frequency module (1, 1*a*, 1*b*, or 1*c*) according to the seventh aspect, the one or more inductors (L1 to L6) of the second matching circuit (15) are disposed on the second principal surface (512) of the substrate (5) opposite the first principal surface (511).

The radio frequency modules (1, 1*a*, 1*b*, and 1*c*) according to the eighth aspect can more effectively prevent jumping of the radiation than the radio frequency modules (1, 1*a*, 1*b*, and 1*c*) according to the seventh aspect do.

According to a ninth aspect, in the radio frequency module (1, 1*a*, 1*b*, or 1*c*) according to the third aspect, at least one inductor (L4) of the second matching circuit (15) is disposed inside the substrate (5).

In the radio frequency modules (1, 1*a*, 1*b*, and 1*c*) according to the ninth aspect, the substrate (5) can be reduced in size. It is also possible to improve flexibility in laying out electronic components on the second principal surface (512) of the substrate (5).

According to a tenth aspect, in the radio frequency module (1, 1*a*, 1*b*, or 1*c*) according to the first or second aspect, the second matching circuit (15) is electrically connected to the second output terminal (122) and includes one or more inductors (L1 to L6). The third matching circuit (16) is electrically connected to the third output terminal (132) through a bonding wire (W2), and includes one or more inductors (L21 and L22). The ground layer (52) is disposed between at least one (L1) of the inductors (L1 to L6) of the second matching circuit (15) and the bonding wire (W2).

According to an eleventh aspect, the radio frequency module (1, 1*a*, 1*b*, or 1*c*) according to any one of the first to tenth aspects further includes a fourth transmitting circuit (210). The fourth transmitting circuit (210) includes a fourth power amplifier (21). The fourth transmitting circuit (210) transmits a fourth transmission signal of a fourth frequency band for 4G or 5G. The fourth frequency band is higher than the third frequency band. At least part of the second frequency band overlaps at least part of the fourth frequency band.

According to a twelfth aspect, the radio frequency module (1, 1*a*, 1*b*, or 1*c*) according to the eleventh aspect further includes a mid-band antenna terminal (T20), a mid-band antenna switch (24), a mid-band reception path (MR1), and a mid-band transmission path (MT1). The mid-band antenna terminal (T20) is electrically connected to an antenna (200). The mid-band antenna switch (24) is connected to the mid-band antenna terminal (T20). The mid-band reception path (MR1) is connected to the mid-band antenna switch (24) and supports the fourth frequency band.

The radio frequency modules (1, 1*a*, 1*b*, and 1*c*) according to the twelfth aspect can support carrier aggregation or dual connectivity.

According to a thirteenth aspect, the radio frequency module (1, 1*a*, 1*b*, or 1*c*) according to the fourth aspect further includes a fourth transmitting circuit (210), a mid-band antenna terminal (T20), a mid-band antenna switch (24), a mid-band reception path (MR1), a mid-band transmission path (MT1), and a diplexer (300). The fourth transmitting circuit (210) includes a fourth power amplifier (21). The fourth transmitting circuit (210) transmits a fourth transmission signal of a fourth frequency band for 4G or 5G. The fourth frequency band is higher than the third frequency band. The mid-band antenna terminal (T20) is electrically connected to an antenna (200). The mid-band antenna switch (24) is connected to the mid-band antenna terminal (T20). The mid-band reception path (MR1) is connected to the mid-band antenna switch (24) and supports the fourth frequency band. The diplexer (300) includes a low-band filter (301) and a mid-band filter (302). At least part of the second frequency band overlaps at least part of the fourth frequency band. The low-band antenna terminal (T10) is connected to the low-band filter (301), and the mid-band antenna terminal (T20) is connected to the mid-band filter (302).

According to a fourteenth aspect, in the radio frequency module (1, 1*a*, 1*b*, or 1*c*) according to the thirteenth aspect, a fourth output terminal (212) of the fourth power amplifier (21) is connected to the mid-band antenna switch (24).

A communication device (400) according to a fifteenth aspect includes a first radio frequency module and a second radio frequency module (2). The first radio frequency module is one of the radio frequency modules (1, 1*a*, 1*b*, and 1*c*) according to the first to tenth aspects. The second radio frequency module (2) includes a fourth transmitting circuit (210) that transmits a fourth transmission signal of a fourth frequency band. The fourth frequency band is higher than the third frequency band and is for 4G or 5G. At least part of the second frequency band overlaps at least part of the fourth frequency band.

In the communication device (400) according to the fifteenth aspect, the harmonic wave of the third transmission signal of the third transmitting circuit (130) supporting 4G or 5G can be prevented from jumping to the second transmitting circuit (120) supporting 2G.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A radio frequency module comprising:
   a first transmitting circuit comprising:
      a first power amplifier, and
      a first matching circuit connected to a first output terminal of the first power amplifier, the first transmitting circuit being configured to transmit a first transmission signal of a first frequency band of a second-generation mobile communication system;
   a second transmitting circuit comprising:
      a second power amplifier, and
      a second matching circuit connected to a second output terminal of the second power amplifier, the second transmitting circuit being configured to transmit a second transmission signal of a second frequency band of the second-generation mobile communication system, the second frequency band being greater than the first frequency band;
   a bypass terminal connected to an output of the second transmitting circuit;
   a third transmitting circuit comprising:
      a third power amplifier, and
      a third matching circuit connected to a third output terminal of the third power amplifier, the third transmitting circuit being configured to transmit a third transmission signal of a third frequency band of a fourth- or fifth-generation mobile communication system; and
   a substrate to which the first transmitting circuit, the second transmitting circuit, and the third transmitting circuit are mounted, the substrate comprising a first principal surface and a second principal surface opposite each other, and a ground layer,
   wherein a frequency of a harmonic wave of the third transmission signal overlaps the second frequency band, and
   wherein the ground layer is between part of the second transmitting circuit and part of the third transmitting circuit.

2. The radio frequency module according to claim 1, wherein:

the second matching circuit is mounted on the second principal surface of the substrate;

the third matching circuit is mounted on the first principal surface of the substrate; and the ground layer is between the second matching circuit and the third matching circuit.

3. The radio frequency module according to claim 1, wherein:

the second matching circuit comprises one or more inductors;

the third matching circuit comprises one or more inductors; and the ground layer is between at least one of the inductors of the second matching circuit and at least one of the inductors of the third matching circuit.

4. The radio frequency module according to claim 3, wherein:

the first power amplifier and the third power amplifier are located closer to the first principal surface of the substrate than to the second principal surface of the substrate; and the at least one inductor of the second matching circuit is located on the second principal surface of the substrate.

5. The radio frequency module according to claim 4, wherein the one or more inductors of the second matching circuit are located on the second principal surface of the substrate.

6. The radio frequency module according to claim 3, wherein at least one inductor of the second matching circuit is inside the substrate.

7. The radio frequency module according to claim 1, further comprising:

a low-band antenna terminal;

a low-band antenna switch between the low-band antenna terminal, and the first and third output terminals; and a reception filter between the low-band antenna switch and the third matching circuit, the reception filter being configured to pass a reception signal of the third frequency band.

8. The radio frequency module according to claim 7, further comprising:

a plurality of low-band duplexers, each of the low-band duplexers comprising an antenna-side terminal, a transmitting terminal, and a receiving terminal, the antenna-side terminals being connected to the low-band antenna switch;

a low-band band switch between the third output terminal and the transmitting terminals of the low-band duplexers, the low-band band switch being configured to selectively connect one of the low-band duplexers to the third output terminal; and a plurality of low-band signal output terminals connected one-to-one to respective receiving terminals of the low-band duplexers, wherein one of the low-band duplexers comprises the reception filter.

9. The radio frequency module according to claim 7, further comprising:

a fourth transmitting circuit comprising a fourth power amplifier, the fourth transmitting circuit being configured to transmit a fourth transmission signal of a fourth frequency band of the fourth- or fifth-generation mobile communication system, the fourth frequency band being greater than the third frequency band;

a mid-band antenna terminal;

a mid-band antenna switch connected to the mid-band antenna terminal;

a mid-band reception path connected to the mid-band antenna switch and configured to pass signals in the fourth frequency band;

a mid-band transmission path connected to the mid-band antenna switch and connected to the bypass terminal; and a diplexer comprising a low-band filter and a mid-band filter, wherein:

at least part of the second frequency band overlaps at least part of the fourth frequency band;

the low-band antenna terminal is connected to the low-band filter; and the mid-band antenna terminal is connected to the mid-band filter.

10. The radio frequency module according to claim 9, wherein a fourth output terminal of the fourth power amplifier is connected to the mid-band antenna switch.

11. The radio frequency module according to claim 1, wherein:

the first frequency band comprises a frequency band of the Global System for Mobile Communications 850 and a frequency band of the Global System for Mobile Communications 900;

the second frequency band comprises a frequency band of the Global System for Mobile Communications 1800 and a frequency band of the Global System for Mobile Communications 1900; and the third frequency band comprises a frequency band of Band 8 of the Long-Term Evolution or a frequency band of n8 of the fifth-generation New Radio.

12. The radio frequency module according to claim 1, wherein:

the second matching circuit is electrically connected to the second output terminal, and comprises one or more inductors;

the third matching circuit is electrically connected to the third output terminal through a bonding wire, and comprises one or more inductors; and the ground layer is between at least one of the inductors of the second matching circuit and the bonding wire.

13. The radio frequency module according to claim 1, further comprising a fourth transmitting circuit comprising a fourth power amplifier, the fourth transmitting circuit being configured to transmit a fourth transmission signal of a fourth frequency band of the fourth- or fifth-generation mobile communication system, the fourth frequency band being greater than the third frequency band, wherein at least part of the second frequency band overlaps at least part of the fourth frequency band.

14. The radio frequency module according to claim 13, further comprising:

a mid-band antenna terminal;

a mid-band antenna switch connected to the mid-band antenna terminal;

a mid-band reception path connected to the mid-band antenna switch and configured to pass signals in the fourth frequency band; and a mid-band transmission path connected to the mid-band antenna switch and connected to the bypass terminal.

15. A communication device comprising:

a first radio frequency module, the first radio frequency module being the radio frequency module according to claim 1; and a second radio frequency module, wherein:

the second radio frequency module comprises a fourth transmitting circuit configured to transmit a fourth transmission signal of a fourth frequency band of the fourth or fifth-generation mobile communication system, the fourth frequency band being greater than the third frequency band; and at least part of the second frequency band overlaps at least part of the fourth frequency band.

* * * * *